Figures 1, 6:
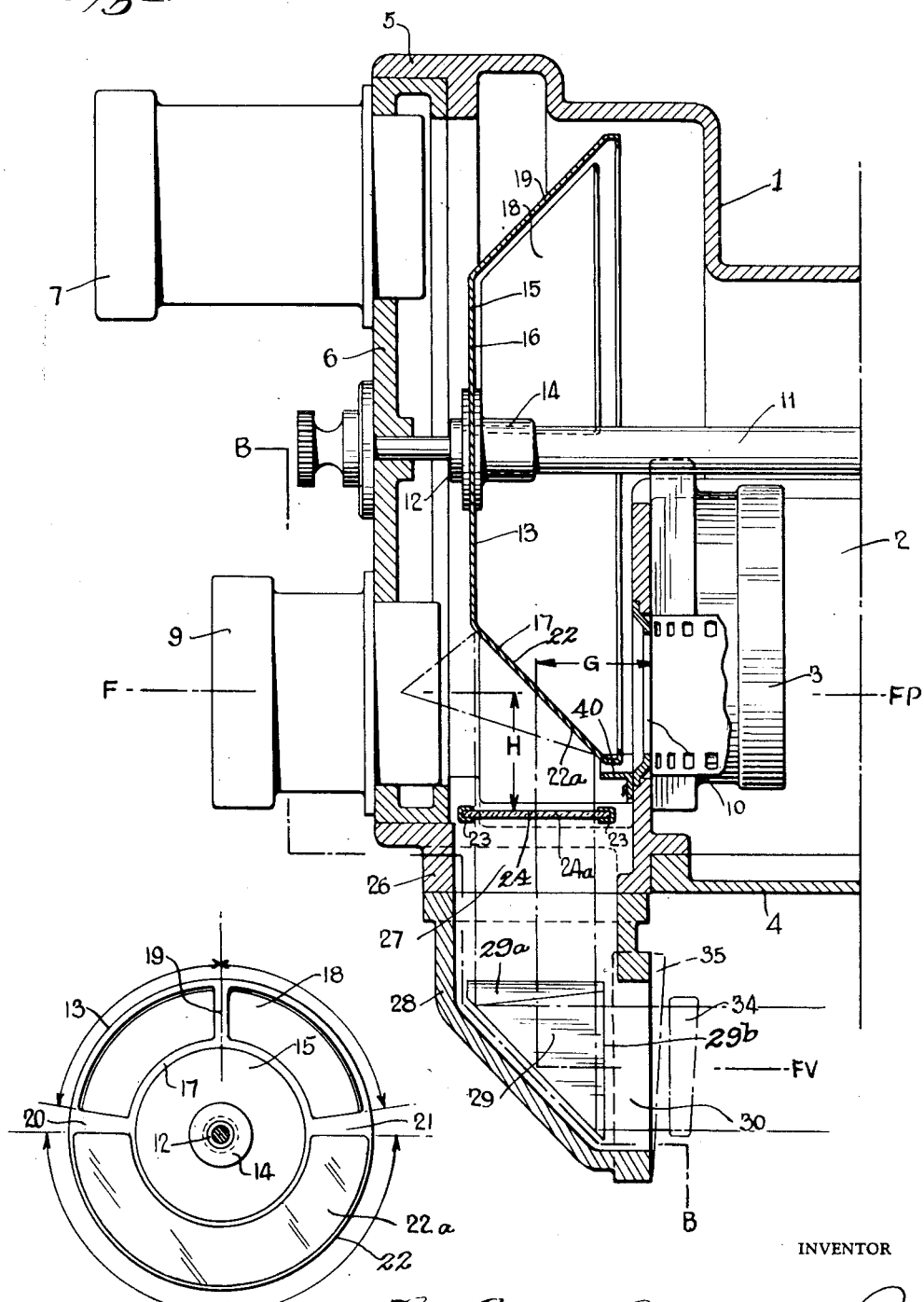

Dec. 15, 1931.   O. A. ROSS   1,836,340
FOCUS AND FINDING APPARATUS FOR MOTION PICTURE CAMERAS
Filed April 23, 1927   2 Sheets-Sheet 1

INVENTOR
Oscar A. Ross.

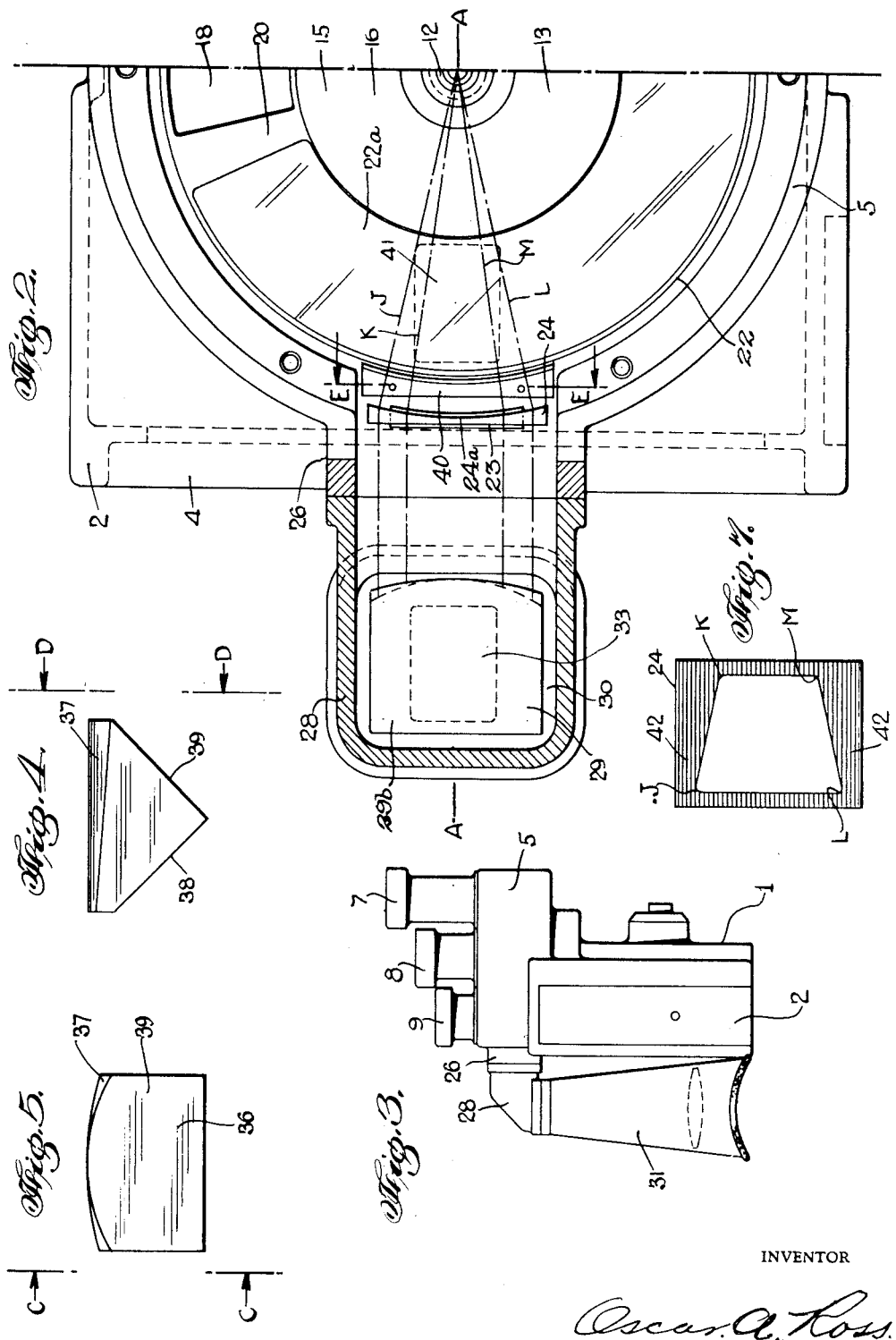

Patented Dec. 15, 1931

1,836,340

UNITED STATES PATENT OFFICE

OSCAR A. ROSS, OF NEW YORK, N. Y.

FOCUS AND FINDING APPARATUS FOR MOTION PICTURE CAMERAS

Application filed April 23, 1927. Serial No. 186,088.

This invention relates to focusing finders and more particularly to that class of focusing finders employed in connection with motion picture cameras.

Preliminary to photographing a "movie scene on location" it is customary to focus on the "set" by focusing through the "focusing aperture," ordinarily supplied on standard motion picture cameras, thereafter shifting said camera and "swinging the lens" to the "photographing aperture."

If, for any reason, the distance of the point focused upon should vary during the "shooting of the scene" the adjustment of the lens for proper focus must be estimated by the photographer.

Further, if through "action" the scene is materially "shifted" whereby the center of focus of the "set" does not register with the center of focus of the camera lens, and it becomes necessary to shift the camera to reestablish registration of focus with the set, such registration must also be estimated by viewing through a finder, the axis of focus of which, does not register with the axis of focus of the photographing lens, and whereas motion picture photographers become more or less expert in estimating the aforesaid registration and point of focus, many errors obtain, and, it is customary to employ a number of motion picture cameras in photographing a scene, where considerable action obtains, or where the distance between the camera and the "set" may be substantially varied during the "shooting of a scene," or if a high degree of delineation of the "frame" is required, for the purpose of obtaining proper reproduction of the scene on a film.

Furthermore to acquire skill for the aforesaid estimations requires a prolonged experience, usually at the expense of motion picture producers, and after becoming skilled the motion picture photographers usually command high salaries.

The prime object of this invention is to overcome the aforesaid difficulties by adding a novel system of focusing and finding to a standard motion picture camera, and comprising, in reality, a motion picture projector combined with a motion picture camera, and wherein the shutter ordinarily employed in a motion picture camera is modified to effect a reproduction of the true image, as it would be viewed at the photographing aperture before the eyes of the photographer however in enlarged and upright form, and while the camera is in operation, as for example when "shooting a scene on location."

The advantages of such an arrangement will at once be apparent, for example:

While a photographer is "shooting a scene", he may also view the scene, as it appears in the photographing aperture of his camera, and, when change of focus, or, a shift of the camera is required, it may be accurately made without guessing, estimating or interruption of the camera operation.

In addition to obtaining properly focused or sharply denoted pictures on the negatives and accurate marginal delineation of the "set" or scene on each "frame" under all conditions of "shooting of a scene", it is also possible to accomplish this result by employing motion picture photographers of ordinary skill, in this manner reducing the cost of the motion picture production.

Other objects and advantages will appear as the description of the invention progresses, and the novel features of the invention will be pointed out in the appended claims.

This invention consists in the novel construction and arrangement of parts hereinafter described, delineated in the accompanying drawings, and particularly pointed out in that portion of the instrument wherein patentable novelty is claimed for certain and peculiar features of the invention, it being understood that, within the scope of what hereinbefore thus is claimed, divers changes in the form, proportions, size and minor details of the system may be made without departing from the spirit of, or sacrificing any of the details of the invention.

In describing the invention in detail, reference is had to the accompanying drawings, wherein I have illustrated embodiments of my invention, and wherein like characters of reference designate corresponding parts through the several views, and in which:—

Figure 1 is a part sectional, part elevated view of one embodiment of the invention as applied to a Bell and Howell or Mitchell standard motion picture camera and is taken on line A—A of Fig. 2, and Fig. 2 is also a part elevational part sectional view of the same camera with the turret removed, taken on line B—B of Fig. 1, and Fig. 3 is a top elevated view of a motion picture camera with magazines removed and to which applicant's invention has been attached and Fig. 4 is a side view of a modified form of prism, taken on line C—C of Fig. 5, and Fig. 5 is a diagonal face view of the same prism taken on line D—D of Fig. 4, and Fig. 6 is a plan view of the modified form of shutter, employed with applicant's invention, and Fig. 7 is a plan view of a combined view receiving prism and mask, and is taken on line E—E of Fig. 2.

Referring to Figs. 1 and 2, motion picture camera 1, comprises in part shuttle mechanism housing 2, with shuttle mechanism 3, and door 4; turret head support 5, supporting turret 6, having lenses 7, 8, and 9 of well known structure and function mounted thereon and adapted to be swung opposite to photographing aperture 10 in a well known manner.

To the shutter shaft 11, is secured by locknut 12, the modified shutter 13, comprising a hub 14, mounted on which is the shutter disk 15, having the plane section 16, and diagonal or bevel section 17, the latter having the photographing opening 18, with reinforcement 19, the opaque sections 20 and 21 and the reflecting section 22, having mirrored surface 22a.

Suitably secured in supports 23—23, mounted in turret head 5, is image receiving member, or ground glass 24, the distance H from the center of focus of lens 9, (the lens axis) to the image appearing surface thereof being substantially the same as the distance G along the axis of said lens to the photographing aperture 10.

Turret head support 5 in addition to being somewhat lengthened axially is further modified to form extension 26, having view projecting opening 27, suitably secured to which, is prism housing 28, containing a suitably mounted prism as 29, adapted to project the image through opening 30, preferably to a magnifying view finder 31 (see Fig. 3) of a type as disclosed in Patent No. 1,584,186 issued to George A. Mitchell on May 11th, 1926, and wherein a single motion picture "frame" is magnified approximately five times and also inverted as projected by a photographic lens, whereby the image appearing in magnified form is viewed right side up or in normal position.

The operation of applicant's novel structure is as follows:—

Assuming a camera as 1, to be in operation and photographing a scene; during the photographing period of the cycle required to complete a "frame" the photographic opening 18, of shutter 13, exposes a frame of the film 32, in photographing aperture 10, to the image rays, projected by lens 9, the axis of which is F—FP, this operation occurring in ordinary sequence of motion picture photography, the shuttle mechanism 3, holding film 32, stationary, in a well known manner while photographing the "set" obtains.

At the completion of the photographing period of the cycle the continued rotation of shutter 13 causes the opaque sections 20 or 21, subsequently followed by the reflecting section 22, to cover the photographing aperture 10, while the film 32, is being advanced to a new frame position. As the reflecting section 22 enters the projected image area of lens 9, the image projected thereby is reflected along axis F—FV to mirrored surface 22a of said reflecting section, and thence obliquely, substantially at right angles, or ninety degrees, onto the view receiving member or ground glass 24. The image projected onto the cylindrical receiving surface 24a, of said member will be somewhat distorted, in the upper and lower edges of the frame, as compared to the image normally viewed at the photographing aperture, (assuming perfect focus) this distortion being due to the curved surface of the reflecting area 22a of shutter 13. However said distortion is subsequently corrected by the conical surface 29a of prism 29 and a true image as 33, correct as to dimensions and sharpness appears as shown on face 29b of prism 29, with the exception that it is inverted in the same manner as when normally viewed at the photographing aperture 10.

With a magnifying finder as 31, as hereinbefore described, attached to prism housing 28, the image 33, is substantially magnified and also corrected to right side up, whereby a motion picture photographer may distinctly view the image projected by the photographing lens as 9, as if he were viewing the actual scene being photographed.

If desired, a sub-angle prism as 34, shown dotted in Fig. 1, may be interposed between the face 29b of prism 29 and the magnifying finder 31, whereby the viewing end of said finder may be arranged more remote from the rear end of the camera body, in such event the opening 30, of housing 28, would comprise the bevel addition 35, shown as a dotted adjunct to housing 28.

Figs. 4 and 5 illustrate a modified form of prism 36, having substantially the same function as prism 29 and in which the image ray bending face 37, is formed conically and the receiving and projecting faces 38 and 39 are formed as plane surfaces.

A baffle as 40 is suitably attached to the turret housing 5 to prevent reflected light entering the photographing aperture 10, during the film advancing period of the cycle.

Whereas the image projected on the combined reflecting and refracting surface 22a by the lens 9, is of substantially larger area and dimensions than that of the photographing aperture, a preferred selected area as 41, registering with the delineation of the photographing aperture 10, along axis F—FP is chosen and shown dotted on surface 22a and the four corners of the image projected by this area onto the image receiving member 24, is indicated by the lines J, K, L, and M, this last named projected area assuming the form substantially as shown by Fig. 7, the border area 42, comprising opaque sections forming the mask for obtaining the correct frame on the image reflected by prism 29.

From the foregoing, it will be seen, that the applicant's novel structure comprises in reality an instrument which functions simultaneously as a motion picture camera and a motion picture projector, the camera portion photographing the image projected by the lens onto the film and the motion picture projector portion projecting the same image into view of a motion picture photographer when his sight is directed into a suitable finder as 31, attached to applicant's novel structure. Whereas these operations are distinct and separate, they occur with such rapidity that the view appearing in finder 31, appears as a continuous one, much in the same manner as a motion picture is projected by a motion picture projector and viewed by the audience in a motion picture theater.

What I claim is:—

1. In combination, a motion picture camera having a housing, a view finder and an objective supported thereby, a film actuating mechanism supported therein arranged to intermittently position a film whereby a beam of image rays projected by the objective may be photographically impressed on the film, a rotatable opaque shutter member supported by the housing having a conical section formed thereon, arranged to travel in the beam between the objective and the film, an orifice formed in a portion thereof arranged to permit the rays of the beam to pass from the objective to the film during the stationary period thereof, a mirrored surface formed on the remaining portion of the conical section arranged to reflect the beam from the objective into the finder as a distorted image as the film is being advanced by the mechanism, an optical system positioned between the mirrored surface and the viewing end of the finder arranged to correct the distorted image to normal whereby the image viewed in the finder is the same as that photographically impressed on the film, and means for operating the shutter and the mechanism in synchronism whereby the image projected by the beam from the objective is photographically impressed on the film as the orifice registers therewith and is projected into the finder as the reflecting surface registers therewith.

2. In combination, a motion picture camera having a housing, a door hinged thereto for access thereinto, a view finder having a view receiving end and a view finding end supported thereby, an objective supported by the housing, a film actuating mechanism supported by the housing, arranged to intermittently position a film whereby a beam of image rays projected by the objective may be photographically impressed thereon, a shutter supported by the housing arranged to travel in the path of the beam between the objective and the film having an orificed portion arranged to permit the beam to pass from the objective to the film while the film is stationary and an opaque portion arranged to interrupt the beam while the film is being advanced by the mechanism, reflecting means supported by the opaque portion arranged to deflect the beam projected by the objective into the finder, an orifice in the housing through which the finder beam is arranged to pass to the finder, a subsidiary housing arranged to be supported by the camera housing independently of the door having an entrance orifice arranged to register with the finder orifice in the camera housing, an exit orifice therein angularly displaced to the entrance orifice arranged to register with the view receiving end of the finder, an optical member supported in the subsidiary housing arranged to angularly displace the beam deflected by the reflecting surface of the shutter whereby the beam entering the entrance end of the subsidiary housing is directed into the view receiving end of the finder, means for supporting the view finder, and means for operating the shutter and the mechanism in synchronism whereby the beam is photographically impressed on the film as the orifice registers therewith and is projected into the finder as the reflecting surface registers therewith.

3. In combination, a motion picture camera having a housing, a view finder and an objective supported thereby, a film actuating mechanism supported therein arranged to intermittently position a frame of the film for photographic exposure whereby the beam of image rays projected by the objective may be photographically impressed thereon, a rotatable shutter supported by the housing, a conical opaque section formed thereon arranged to travel in the beam between the objective and the film at an acute angle to the axis thereof, an orifice in the conical section arranged to permit the beam to pass from the objective to the film during one portion of rotation of the shutter, a mirrored surface formed on the remaining portion thereof arranged angularly to reflect the beam projected by the objective into the finder during another portion of the rotation of the shutter, and means for operating the shutter and the mechanism in synchronism whereby the orifice registers with the beam and the image produced thereby is photographically impressed on the film during the stationary period thereof and the mirrored surface intercepts and reflects the beam from the objective into the finder during the period the film is being advanced by the mechanism.

4. In combination, a motion picture camera having a housing, a view finder and an objective supported thereby, a film actuating mechanism supported therein arranged to intermittently position a frame of the film for photographic exposure whereby the beam of image rays projected by the objective may be photographically impressed thereon, a rotatable shutter supported by the housing, a conical opaque section formed thereon arranged to travel in the path of the beam between the objective and the film and at an acute angle to the axis thereof, a light exposing orifice formed therein arranged to permit the beam to pass from the objective to the film during one portion of the rotation of the shutter, a mirrored surface formed on the remaining portion of the conical section arranged to reflect the beam projected by the objective into the finder in the form of a distorted image, an optical system positioned between the mirrored surface and the viewing end of the finder arranged to correct the distorted image to normal whereby the image viewed in the finder is the same as that photographically impressed on the film, and means for operating the shutter and the mechanism in synchronism whereby the beam is photographically impressed on the film as the orifice registers therewith and is projected into the finder as the reflecting surface registers therewith.

5. In combination, a motion picture camera having a housing, a view finder and an objective supported thereby, a film actuating mechanism supported therein arranged to intermittently position a frame of the film for photographic exposure whereby the beam of image rays projected by the objective may be photographically impressed thereon, a rotatable shutter supported by the housing, a conical opaque section formed thereon arranged to travel in the path of the beam between the objective and the film and at an acute angle to the axis thereof, a light exposing orifice formed therein arranged to permit the beam to pass from the objective to the film during one portion of the rotation of the shutter, a mirrored surface formed on the remaining portion of the conical section arranged to reflect the beam projected by the objective into the finder in the form of a distorted image, an image depicting member positioned in the finder beam between the mirrored surface and the viewing end of the finder arranged to refract the divergent rays forming the distorted image into a beam of rectilinear rays, an optical member positioned in the finder beam between the image depicting member and the viewing end of the finder arranged to refract the rays of the rectilinear beam whereby a normal image will appear on the viewing face of the last named member, and means for operating the shutter and mechanism in synchronism whereby the beam projected by the objective is photographically impressed on the film as the orifice registers therewith and is projected into the finder as the mirrored surface registers therewith.

6. In combination, a motion picture camera having a housing, a view finder and an objective supported thereby, a film actuating mechanism supported therein arranged to intermittently position a film at a photographing aperture having a margin representing a frame on a motion picture film, whereby a beam of image rays projected by the objective may be photographically impressed thereon, a rotatable shutter supported by the housing, a conical opaque section thereon arranged to travel in the beam between the objective and the aperture, an orifice in a portion thereof arranged to permit the beam to pass from the objective to the aperture during the stationary period of the film, a reflecting surface formed on the remaining portion arranged to reflect the beam projected by the objective into the finder in the form of a distorted image, a mask positioned in the path of the finder beam having a distorted frame margin arranged to produce the same field in the distorted frame as is delineated by the margin of the aperture, an optical system positioned between the reflecting surface and the viewing end of the finder for correcting the distorted image and margin thereof to normal, whereby the frame viewed in the finder will be of the same proportions as the frame photographically impressed at the aperture, and means for operating the shutter and mechanism is synchronism whereby the beam is photographically impressed on the film as the orifice registers therewith and is projected into the finder as the reflecting surface registers therewith.

7. In a motion picture camera the combination of a housing, a view finder and an objective supported thereby, a film advancing mechanism supported therein arranged to support a film whereby image rays from the objective may be directed thereon, a shutter supported by the housing having an opaque conical portion arranged to travel in the path of the image rays between the objective and the film, an orifice in the conical portion thereof arranged to permit the rays to pass from the objective to the film during the stationary period thereof, a reflecting surface on the conical portion positioned in juxtaposition to the orifice arranged to reflect the rays into the finder in reverse form during the period the film is being advanced by the mechanism, an optical system supported by the view finder arranged to revert the image to normal view and produce an enlargement thereof when viewed from the viewing end of the finder, and means for operating the shutter and the mechanism in synchronism whereby the beam projected by the objective will be photographically impressed on the film as the orifice registers therewith and will be reflected into the finder as the mirrored surface registers therewith.

8. In a motion picture camera the combination of a housing, a view finder and an objective supported thereby, a film advancing mechanism supported therein arranged to support the film whereby the beam of image rays projected by the objective may be directed thereon, a shutter member rotatably supported by the housing having an opaque frustro-conical portion arranged to intercept the beam between the objective and the film, an orifice formed in the frustro-conical portion arranged to permit the beam to pass from the objective to the film during a partial revolution of the shutter member, a reflecting surface formed on the frustro-conical portion arranged to angularly reflect the beam projected by the objective into the finder during another partial revolution of the shutter member, and means for operating the shutter member and the mechanism in synchronism whereby the image rays of the beam will be photographically impressed on the film as the orifice registers therewith and the beam will be deflected into the finder as the reflecting surface registers therewith.

9. In combination, a motion picture camera having a housing, a view finder and an objective supported thereby, a film advancing mechanism supported by the housing arranged to intermittently position a film whereby a beam of image rays projected by the objective may be photographically impressed thereon, a shutter member supported by the housing positioned to rotate on an axis substantially parallel to the axis of the beam projected between the objective and the film, an opaque intercepting member supported thereby arranged to intercept the beam projected between the objective and the film, an orifice formed therein arranged to permit the beam projected by the objective to pass to the film during a partial rotation of the shutter member, a reflecting surface formed on the opaque member arranged to angularly reflect the beam projected by the objective into the finder during another partial revolution thereof, and means supported by the housing for operating the shutter member and the mechanism in synchronism whereby the beam projected by the objective is photographically impressed on the film as the orifice registers therewith and is projected into the finder as the reflecting surface registers therewith.

10. In a motion picture camera the combination of a housing, a view finder and an objective supported thereby, a film advancing mechanism supported by the housing arranged to position a film whereby the beam of image rays projected by the objective may be directed thereupon, a shutter member rotatably supported by the housing having an opaque frustro-conical portion arranged to intercept the beam between the objective and the film, an orifice formed in the frustro-conical portion arranged to permit the beam to pass from the objective to the film during a partial revolution of the shutter member, a reflecting surface formed on the frustro-conical portion arranged to angularly reflect the beam from the objective into the finder during another partial revolution of the shutter member, a light baffle member rigidly secured to the housing adjacent the peripheral edge of the shutter member arranged to prevent reverse light rays from the finder to reach the film, and means for operating the shutter member and the mechanism in synchronism whereby the film will be stationary and the image rays from the objective will be impressed thereon as the orifice registers with the beam and the beam will be deflected into the finder and the film will be advanced as the reflecting surface registers with the beam.

11. In a motion picture camera the combination of a housing, a view finder and an objective supported thereby, a film advancing mechanism supported by the housing arranged to intermittently position a film whereby the beam of image rays projected by the objective will be photographically impressed upon the film, an opaque shutter member rotatably supported by the housing an orificed portion formed therein arranged to permit the beam to pass from the objective to the film during a partial revolution of the shutter member, a frustro-conical portion formed on the shutter member arranged to travel in a plane obliquely to the axis of the beam between the objective and the finder, reflecting means supported thereby arranged to angularly deflect the beam from the objective into the finder during another partial revolution of the shutter member, and means for operating the shutter member and the mechanism in synchronism whereby the film will be stationary and the image rays from the objective will be impressed upon the film as the orifice registers with the beam and the beam will be deflected into the finder and the film will be advanced as the reflecting means registers with the beam.

12. In combination, a motion picture camera having a housing, a side opening door hinged thereto for access to the mechanism contained therein, an objective supported by the housing portion positioned forwardly of the door, a film actuating mechanism positioned in the housing arranged to intermittently position a film before an aperture whereby a beam of image rays projected by the objective may be photographically recorded thereon, a shutter rotatably supported by the housing arranged to travel in the path of the beam between the objective and the film, the shutter having an orificed portion arranged to pass the beam from the objective to the film during the stationary periods thereof and an opaque portion arranged to intercept the beam during the periods the film is being advanced by the mechanism, reflecting means supported by the opaque portion of the shutter arranged to redirect the beam from the objective obliquely, a light proof passageway formed in the housing forwardly of the aperture having one end thereof arranged to receive the obliquely directed beam thereinto and the other end thereof openable toward the rear end of the camera, the opening terminating forwardly of the door, an optical member positioned in the passageway arranged to redirect the obliquely directed beam from the shutter into the rearwardly facing opening of the passageway, a view finder having a view receiving end and a view finding end arranged to have the view receiving end register with the rearwardly facing opening of the passageway and the view finding end thereof arranged to face rearwardly of the camera whereby the light beam redirected by the optical member will be viewed at the view finding end thereof, means supported by the camera for supporting the view finder, and means for operating the shutter and the mechanism in synchronism whereby the beam will be photographically recorded onto the film as the shutter orifice registers with the beam and projected into the view finder as the reflecting surface of the shutter registers therewith.

In testimony whereof, he has signed his name to this specification this 22nd day of April, 1927.

OSCAR A. ROSS.